US012734957B2

(12) United States Patent
Ikuta

(10) Patent No.: US 12,734,957 B2
(45) Date of Patent: Sep. 15, 2026

(54) LIGHT DISTRIBUTION CONTROL DEVICE

(71) Applicant: TOYOTA JIDOSHA KABUSHIKI KAISHA, Toyota (JP)

(72) Inventor: Tetsuya Ikuta, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 141 days.

(21) Appl. No.: 18/938,576

(22) Filed: Nov. 6, 2024

(65) Prior Publication Data

US 2025/0162494 A1 May 22, 2025

(30) Foreign Application Priority Data

Nov. 17, 2023 (JP) ................................ 2023-195833

(51) Int. Cl.
*B60Q 1/14* (2006.01)

(52) U.S. Cl.
CPC ........ *B60Q 1/1423* (2013.01); *B60Q 2300/41* (2013.01)

(58) Field of Classification Search
CPC .. B60Q 1/1423; B60Q 2300/41; B60Q 1/143; B60Q 2300/056; B60Q 2300/42; B60Q 1/1415; B60Q 1/14
See application file for complete search history.

(56) References Cited

U.S. PATENT DOCUMENTS 10,759,329 B2 9/2020 Morimura et al.
10,946,791 B2 * 3/2021 Morimura .............. B60Q 1/381
11,260,789 B2 3/2022 Morimura et al.
2016/0250964 A1 * 9/2016 Takagaki ................ B60Q 1/08 362/466
2019/0050650 A1 * 2/2019 Takaki ...................... G06T 7/60
2020/0150702 A1 * 5/2020 Ueda ........................ G05D 1/43
2023/0167962 A1 * 6/2023 Sung .................... G06V 20/584 382/104
2024/0246477 A1 7/2024 Ikuta

FOREIGN PATENT DOCUMENTS

JP 2015-016773 A 1/2015
JP 2016-027977 A 2/2016
JP 2016-088223 A 5/2016
JP 2016-159709 A 9/2016
JP 2024-102746 A 7/2024

* cited by examiner

*Primary Examiner* — Bao Q Truong
(74) *Attorney, Agent, or Firm* — Sughrue Mion, PLLC

(57) ABSTRACT

A light distribution control device for controlling a light distribution of a headlight that illuminates in front of a vehicle includes a control unit configured to control the light distribution based on a front captured image of an onboard camera of the vehicle, so that an illuminance of a first region including a front vehicle located ahead of the vehicle is smaller than an illuminance of a second region not including the front vehicle. The control unit is configured to set a range of the first region based on a lateral position of the front vehicle in the front captured image and a lateral movement speed of the front vehicle in the front captured image.

2 Claims, 9 Drawing Sheets

RIGHT MARGIN COEFFICIENT Cr
C1r
0
θ 1r
RIGHT VEHICLE ANGLE θ r

LEFT MARGIN COEFFICIENT CL
C1L
0
θ 1L
LEFT VEHICLE ANGLE θ L

UPPER MARGIN COEFFICIENT Cu
C1u
0
θ 1m
CENTRAL VEHICLE ANGLE θ m

LOWER MARGIN COEFFICIENT Cd
C1d
0
θ 1m
CENTRAL VEHICLE ANGLE θ m

LIGHT DISTRIBUTION CONTROL DEVICE

CROSS-REFERENCE TO RELATED APPLICATION

This application is based upon and claims the benefit of priority from Japanese Patent Application No. 2023-195833, filed on Nov. 17, 2023, the entire contents of which are incorporated herein by reference.

TECHNICAL FIELD

The present disclosure relates to a light distribution control device.

BACKGROUND

Conventionally, there has been known a light distribution control device that controls a light distribution of a vehicle's headlight based on a front captured image from an onboard camera of the vehicle, such that an illuminance of a region including an other vehicle ahead of the vehicle is made smaller than an illuminance of a region that does not include the other vehicle, as described in, for example, Japanese Patent Application Laid-Open No. 2016-159709.

SUMMARY

In a light distribution control device that controls a distribution of light from a vehicle's headlight, it has been considered to set a range of a first region, which is to have a smaller illuminance than a second region not including a front vehicle located ahead of the vehicle, based on a lateral position of the front vehicle in the front captured image of an onboard camera. If a range of the first region is set based solely on the lateral position of the front vehicle in the front captured image, a delay in a processing by a control unit may cause the front vehicle moving laterally in the front captured image to deviate from the range of the first region, for example. On the other hand, expanding the range of the first region in advance considering the movement of the front vehicle may cause that the range of the first region becomes too wide when the front vehicle is not moving laterally in the front captured image.

An example of the present disclosure is a light distribution control device for controlling a light distribution of a headlight that illuminates in front of a vehicle. The light distribution control device includes a control unit configured to control the light distribution based on a front captured image of an onboard camera of the vehicle, so that an illuminance of a first region including a front vehicle located ahead of the vehicle is smaller than an illuminance of a second region not including the front vehicle, wherein the control unit is configured to set a range of the first region based on a lateral position of the front vehicle in the front captured image and a lateral movement speed of the front vehicle in the front captured image.

In the light distribution control device according to an example of the present disclosure, the control unit sets the range of the first region not only based on the lateral position of the front vehicle in the front captured image but also based on the lateral movement speed of the front vehicle in the front captured image. Setting the range of the first region based not only on the lateral position but also on the movement speed of the front vehicle in the front captured image allows suppressing the protrusion of the front vehicle moving laterally in the front captured image when there is a delay in the processing by the control unit, for example. As a result, it is possible to prevent the range of the first region from being set in advance to be too wide when the front vehicle is not moving laterally in the front captured image. Therefore, the light distribution control device according to an example of the present disclosure can set the range of the first region when the front vehicle is moving laterally in the front captured image more appropriately compared to setting based solely on the lateral position of the front vehicle in the front captured image.

In some examples, the control unit may be configured to acquire, based on a right edge position of a front vehicle region surrounding the front vehicle in the front captured image, a right margin to extend the first region rightward relative to the right edge position. The control unit may be configured to acquire, based on a left edge position of the front vehicle region in the front captured image, a left margin to extend the first region leftward relative to the left edge position, The control unit may be configured to increase the right margin and decrease the left margin when the movement speed is equal to or greater than a predetermined right threshold value in a right direction, compared to when the movement speed is less than the right threshold value in the right direction. The control unit may be configured to increase the left margin and decrease the right margin when the movement speed is equal to or greater than a predetermined left threshold value in a left direction, compared to when the movement speed is less than the left threshold value in the left direction.

According to an example of the light distribution control device of the present disclosure, the light distribution control device can set the range of the first region when the front vehicle is moving laterally in the front captured image more appropriately compared to setting based solely on the lateral position of the front vehicle in the front captured image.

DETAILED DESCRIPTION

Hereinafter, an example of the present disclosure will be described with reference to the drawings.

Figure 1:
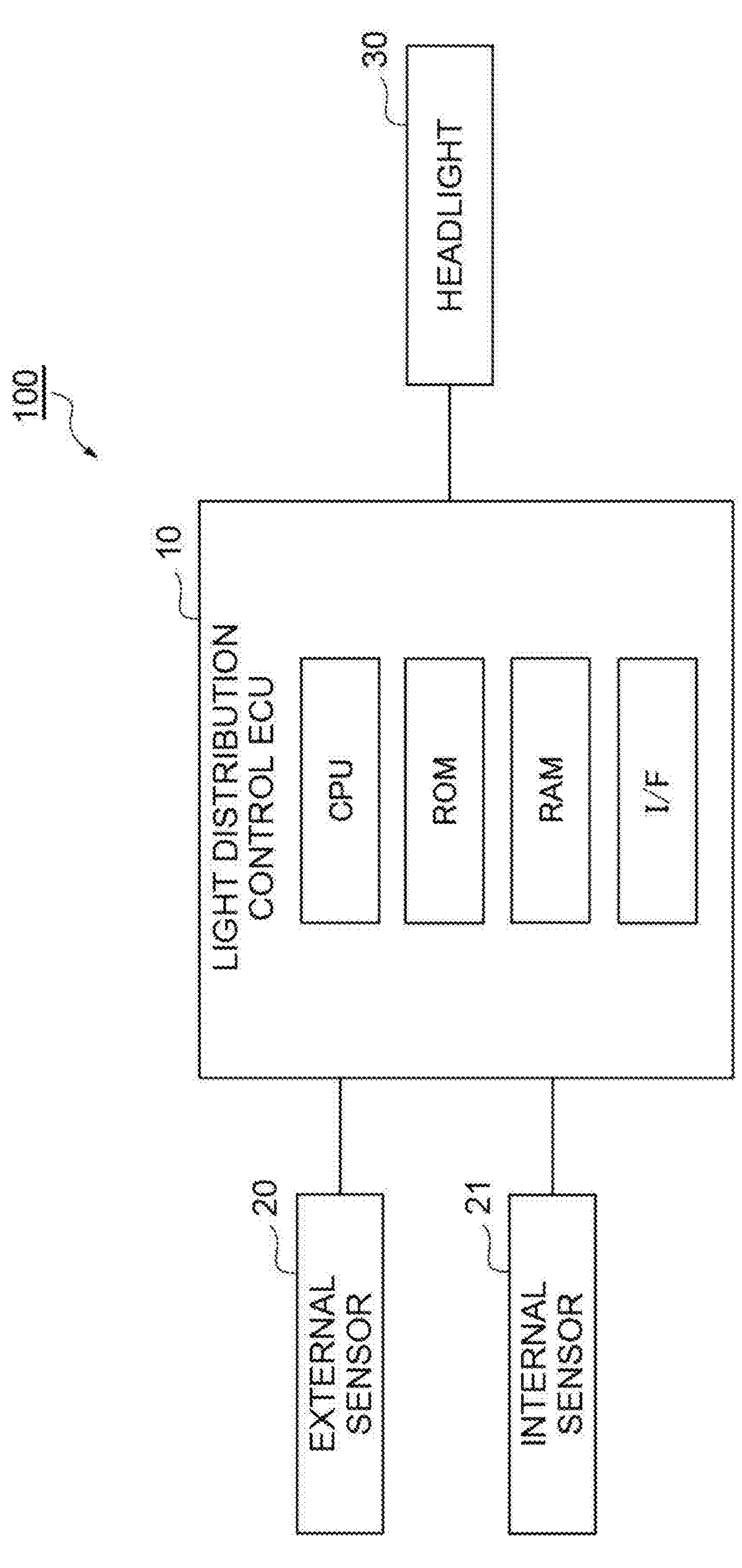
FIG. 1 is a block diagram showing a light distribution control device according to an example.

FIG. 1 is a block diagram showing a light distribution control device according to an example. The light distribution control device 100 is mounted on a vehicle such as a passenger car. The light distribution control device 100 is a device for controlling the light distribution of headlights that illuminate in front of the vehicle. Some functions of the light distribution control device 100 may be executed on a server capable of communicating with the vehicle. In this example, an oncoming lane where an oncoming vehicle (front vehicle) travels is located on the right side of the traveling lane where the vehicle travels.

[Configuration of Light Distribution Control Device]

The configuration of the light distribution control device 100 according to this example will be described with reference to FIG. 1. As shown in FIG. 1, the light distribution control device 100 includes a light distribution control ECU (Electronic Control Unit) (control unit) 10, an external sensor 20, an internal sensor 21, and a headlight 30. The external sensor 20, the internal sensor 21, and the headlight 30 are connected to the light distribution control ECU 10.

The light distribution control ECU 10 is an electronic control unit having a CPU (Central Processing Unit), a storage, and an interface (I/F). The storage is composed of, for example, a ROM (Read Only Memory), RAM (Random Access Memory), EEPROM (Electrically Erasable Programmable Read-Only Memory), and the like. The light distribution control ECU 10 realizes various functions by executing programs stored in the storage with the CPU. The light distribution control ECU 10 may be composed of multiple electronic units.

The external sensor 20 is a detection device that detects the situation around the vehicle. The external sensor 20 includes a camera (onboard camera). The external sensor 20 may also include a radar sensor. The camera is an imaging device that captures the situation in front of the vehicle. The camera is provided, for example, on the back side of the rear-view mirror behind the windshield of the vehicle, capturing the situation in front of the vehicle. The optical axis of the camera coincides with the longitudinal axis of the vehicle in a plan view of the vehicle, for example. Here, the longitudinal axis is an axis passing through the center in the width direction of the vehicle and parallel to the ground surface under the vehicle. The camera transmits a front captured image related to the situation in front of the vehicle to the light distribution control ECU 10.

The radar sensor is a detection device that detects objects around the vehicle using radio waves (for example, millimeter waves) or light. Objects around the vehicle include a front vehicle traveling ahead of the vehicle. The radar sensor may include, for example, a millimeter wave radar or a LiDAR (Light Detection and Ranging). The radar sensor transmits information about detected objects to the light distribution control ECU 10.

The internal sensor 21 is a detection device that detects the traveling state of the vehicle. The internal sensor 21 includes a vehicle speed sensor. The vehicle speed sensor is a detector that detects the speed of the vehicle. A wheel speed sensor that detects the rotational speed of the vehicle's wheels or a drive shaft rotating integrally with the wheels may be used as the vehicle speed sensor. The internal sensor 21 may also include an acceleration sensor and a yaw rate sensor.

The headlight 30 includes, for example, a left headlight provided at the left front end of the vehicle and a right headlight provided at the right front end of the vehicle. The left headlight and the right headlight are driving headlights with a high beam function. The left headlight and the right headlight may also have a low beam function. The headlight 30 is a light using an LED matrix as a light source. The LED matrix includes an LED group composed of multiple LEDs. The LED group is arranged in a two-dimensional manner at predetermined intervals in the horizontal and vertical directions in a front view of the vehicle. The light distribution control ECU 10 independently controls the lighting or extinguishing of each LED in the LED group of the left and right headlights. The light distribution control ECU 10 independently controls the current value supplied to each LED in the LED group of the left and right headlights. When the LED group is controlled to light up by the light distribution control ECU 10, the LED group emits light to illuminate a region in front of the vehicle.

The light distribution control ECU 10 recognizes the traveling state of the vehicle based on the detection result of the internal sensor 21. The traveling state includes the vehicle speed. The traveling state may also include the acceleration and yaw rate of the vehicle. The light distribution control ECU 10 recognizes the vehicle speed based on the vehicle speed information from the vehicle speed sensor. The light distribution control ECU 10 may recognize the vehicle's acceleration based on the acceleration information from the acceleration sensor. The light distribution control ECU 10 may recognize the vehicle's orientation based on the yaw rate information from the yaw rate sensor.

The light distribution control ECU 10 recognizes the situation in front of the vehicle based on the detection result of the external sensor 20. The situation in front includes the traveling state of the front vehicle. The traveling state of the front vehicle includes a relative position, relative speed, and moving direction of the front vehicle with respect to the vehicle. The traveling state of the front vehicle may also include relative angular velocity and relative angular acceleration of the front vehicle. The relative angular velocity is the relative angular velocity of the front vehicle as seen from the vehicle.

The light distribution control ECU 10 detects light sources based on the front captured image. The light sources include ambient light and other vehicle lights. Ambient light is light from streetlights and buildings. Other vehicle lights are lights from the front vehicle, such as headlights of oncoming vehicles and taillights of preceding vehicles. The front vehicle may include not only a front vehicle on the oncoming lane but also a front vehicle traveling in a direction intersecting the traveling direction of the vehicle at an intersection. The light distribution control ECU 10 recognizes the type of detected light source (ambient light or other vehicle light) by a known method.

The light distribution control ECU 10 can execute adaptive high-beam control. Adaptive high-beam control is a control that controls the light distribution (high-beam light distribution) of the headlight 30 so that the illuminance of a first region including the front vehicle is smaller than the illuminance of a second region not including the front vehicle. The first region is a so-called "dimming region" or "shading region."

Figure 2:
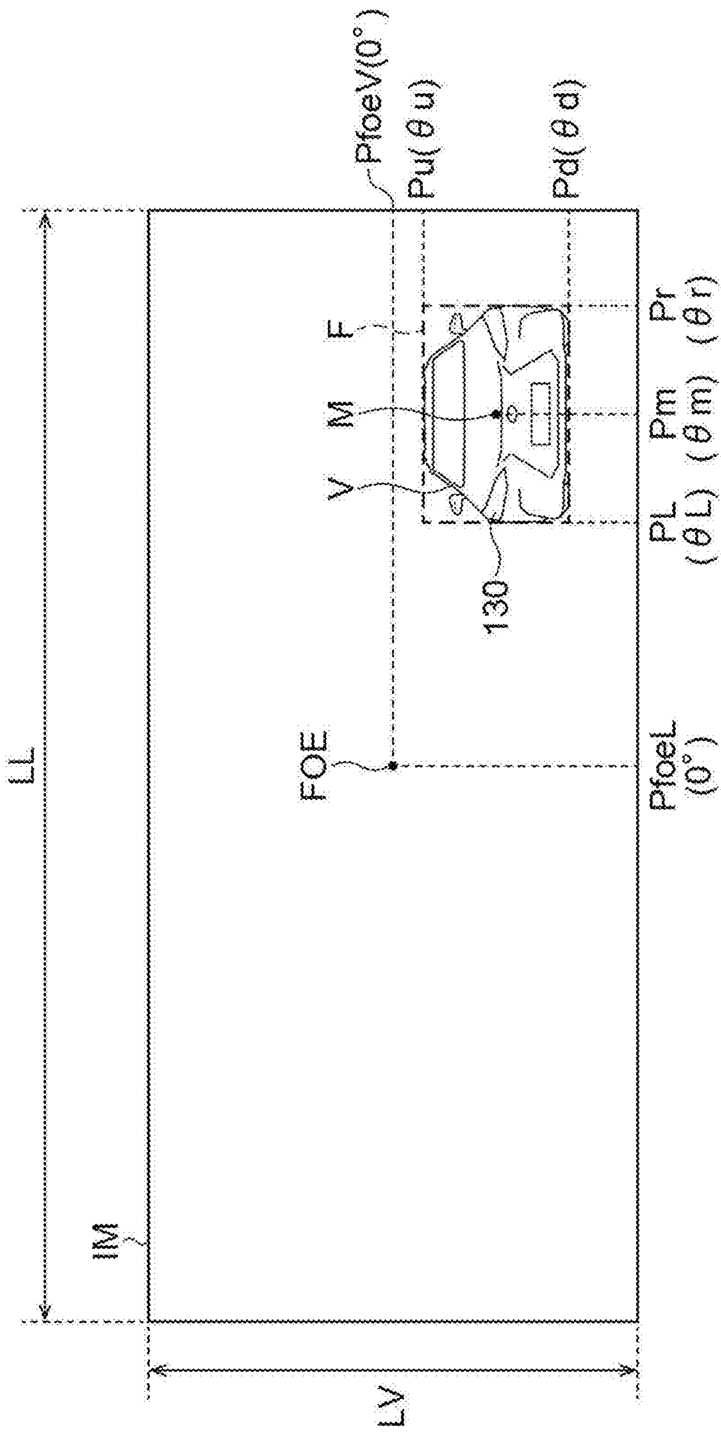
FIG. 2 is a diagram for explaining each vehicle angle of a front vehicle in a front captured image.

FIG. 2 is a diagram for explaining each vehicle angle of a front vehicle in a front captured image. FIG. 2 shows a front captured image IM when a headlight 130, which is a light source of an oncoming vehicle (front vehicle) V, is captured by the camera. In practice, the body of the oncoming vehicle V may not be clearly captured, but for convenience of explanation, the body of the oncoming vehicle V is illustrated in FIG. 2.

As an example, the light distribution control ECU 10 calculates the vehicle angle of the front vehicle based on the front captured image. The vehicle angle of the front vehicle is a relative angle with respect to a predetermined direction, representing the position of the front vehicle as seen from the vehicle. As shown in FIG. 2, the vehicle angle includes a right vehicle angle θr, a left vehicle angle θL, a central vehicle angle θm, an upper vehicle angle θu, and a lower vehicle angle θd. The right vehicle angle θr is an angle (horizontal angle) of the right end of the front vehicle in the lateral direction with respect to the longitudinal axis of the vehicle. The left vehicle angle θL is the horizontal angle of the left end of the front vehicle with respect to the longitudinal axis. The central vehicle angle θm is the horizontal angle at the center of the front vehicle in the lateral direction with respect to the longitudinal axis. The upper vehicle angle θu is an angle (vertical angle) of the upper end of the front vehicle in the vertical direction with respect to the longitudinal axis. The lower vehicle angle θd is the vertical angle of the lower end of the front vehicle in the vertical direction with respect to the longitudinal axis.

The light distribution control ECU 10 estimates a front vehicle region F, which is a region surrounding the front vehicle, based on the light source of the front vehicle detected from the front captured image IM. The front vehicle region F may be rectangular, for example, and may include a pair of sides extending in the horizontal direction and a pair of sides extending in the vertical direction. In the following description, the position in the horizontal direction of any point in the front captured image IM is referred to as "lateral position," and the position in the vertical direction of the point is referred to as "vertical position."

The light distribution control ECU 10 calculates, for example, the lateral position Pr of the right end of the front vehicle region F, the lateral position PL of the left end of the front vehicle region F, the lateral position Pm of the center M of the front vehicle region F, the vertical position Pu of the upper end of the front vehicle region F, and the vertical position Pd of the lower end of the front vehicle region F. The lateral positions Pr, PL, and Pm are calculated, for example, as the lengths (number of pixels) in the horizontal direction from the lateral position PfoeL of the vanishing point FOE (Focus Of Expansion) of the front captured image IM. The vertical positions Pu and Pd are calculated, for example, as the lengths (number of pixels) in the vertical direction from the vertical position PfoeV of the vanishing point FOE.

The light distribution control ECU 10 converts the lateral positions Pr, PL, Pm, and the vertical positions Pu, Pd into angles to calculate the right vehicle angle θr, the left vehicle angle θL, the central vehicle angle θm, the upper vehicle angle θu, and the lower vehicle angle θd.

The length LL in the horizontal direction of the front captured image IM corresponds to the horizontal field of view of the camera. The optical axis of the camera passes through the center in the width direction (lateral direction) of the vehicle. The angle corresponding to the lateral position PfoeL of the vanishing point FOE (lateral angle with respect to the longitudinal axis) is 0°. In this case, the right vehicle angle θr of the oncoming vehicle V can be calculated by proportionally distributing the horizontal field of view of the camera according to the ratio of the lateral position Pr to the horizontal length LL of the front captured image IM. The left vehicle angle θL of the oncoming vehicle V can be calculated by proportionally distributing the horizontal field of view of the camera according to the ratio of the lateral position PL to the horizontal length LL. The central vehicle angle θm of the oncoming vehicle V can be calculated by proportionally distributing the horizontal field of view of the camera according to the ratio of the lateral position Pm to the horizontal length LL.

The length LV in the vertical direction of the front captured image IM corresponds to the vertical field of view of the camera. The optical axis of the camera is directed, for example, so that the vanishing point FOE is located at the center in the vertical direction of the front captured image IM. The angle corresponding to the vertical position PfoeV of the vanishing point FOE (vertical angle with respect to the longitudinal axis) is 0°. In this case, the upper vehicle angle θu of the oncoming vehicle V can be calculated by proportionally distributing the vertical field of view of the camera according to the ratio of the vertical position Pu to the vertical length LV of the front captured image IM. The lower vehicle angle θd of the oncoming vehicle V can be calculated by proportionally distributing the vertical field of view according to the ratio of the vertical position Pd to the vertical length LV.

The light distribution control ECU 10, for example, calculates the right vehicle width angle Δθr and the left vehicle width angle ΔθL from the vehicle width angle of the front vehicle. The vehicle width angle of the front vehicle is an angle representing the range of the vehicle width of the front vehicle as seen from the vehicle as an angle range. The vehicle width angle can be calculated as the difference between the right vehicle angle θr and the left vehicle angle θL. The vehicle width angle corresponds to the horizontal length of the front vehicle (front vehicle region F) in the front captured image IM. The light distribution control ECU 10 calculates, for example, half of the vehicle width angle as the right vehicle width angle Δθr and the left vehicle width angle ΔθL. The right vehicle width angle Δθr corresponds to the horizontal length from the center M of the front vehicle to the right end of the front vehicle region F. The left vehicle width angle ΔθL corresponds to the horizontal length from the center M of the front vehicle to the left end of the front vehicle region F.

The light distribution control ECU 10, for example, calculates the upper vehicle height angle Δθu and the lower vehicle height angle Δθd from the vehicle height angle of the front vehicle. The vehicle height angle of the front vehicle is an angle representing the range of the vehicle height of the front vehicle as seen from the vehicle as an angle range. The vehicle height angle can be calculated as the difference between the upper vehicle angle θu and the lower vehicle angle θd. The vehicle height angle corresponds to the vertical length of the front vehicle (front vehicle region F) in the front captured image IM. The light distribution control ECU 10 calculates, for example, half of the vehicle height angle as the upper vehicle height angle Δθu and the lower vehicle height angle Δθd. The upper vehicle height angle Δθu corresponds to the vertical length from the center M of the front vehicle to the upper end of the front vehicle region F. The lower vehicle height angle Δθd corresponds to the vertical length from the center M of the front vehicle to the lower end of the front vehicle region F.

The light distribution control ECU 10 sets the range of the first region based on the lateral position of the front vehicle in the front captured image and the lateral movement speed of the front vehicle in the front captured image. As an example, the light distribution control ECU 10 determines a margin coefficient to define the range of the first region R1. The margin coefficient includes a right margin coefficient Cr, a left margin coefficient CL, an upper margin coefficient Cu, and a lower margin coefficient Cd. The right margin coefficient Cr is a coefficient for acquiring a right margin to extend the first region rightward relative to the right end position based on the right end position of the front vehicle region in the front captured image. The left margin coefficient CL is a coefficient for acquiring a left margin to extend the first region leftward relative to the left end position based on the left end position of the front vehicle region in the front captured image.

Figures 3A, 3B, 3C, 3D:
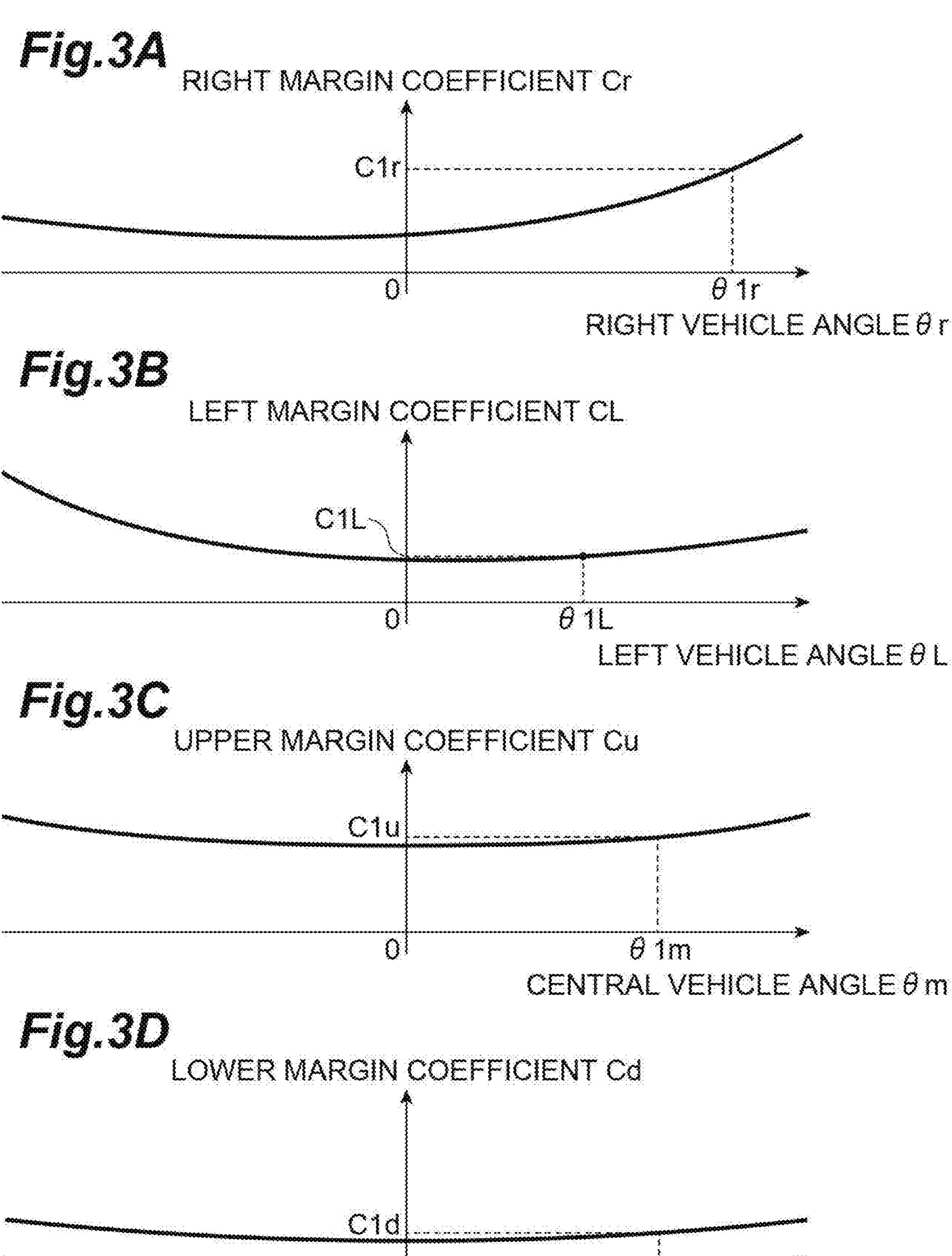
FIG. 3A is a diagram showing a graph of a right margin coefficient.
FIG. 3B is a diagram showing a graph of a left margin coefficient.
FIG. 3C is a diagram showing a graph of an upper margin coefficient.
FIG. 3D is a diagram showing a graph of a lower margin coefficient.

FIG. 3A is a diagram showing a graph of the right margin coefficient. FIG. 3B is a diagram showing a graph of the left margin coefficient. FIG. 3C is a diagram showing a graph of the upper margin coefficient. FIG. 3D is a diagram showing a graph of the lower margin coefficient. In the graphs of FIGS. 3A to 3D, the light distribution control ECU 10 acquires each margin coefficient based on the right end position and the left end position of the front vehicle region in the front captured image. The right margin coefficient C1*r* is determined by reading out the margin coefficient corresponding to the right vehicle angle θ1*r* in the graph of FIG. 3A when the right vehicle angle θr corresponding to the right end position of the front vehicle region F is the right vehicle angle θ1*r*. The left margin coefficient C1L is determined by reading out the margin coefficient corresponding to the left vehicle angle θ1L in the graph of FIG. 3B when the left vehicle angle θL corresponding to the left end position of the front vehicle region F is the left vehicle angle θ1L. The upper margin coefficient C1*u* and the lower margin coefficient C1*d* are determined by reading out the margin coefficient corresponding to the central vehicle angle θ1*m* in the graphs of FIG. 3C and FIG. 3D when the central vehicle angle θm of the front vehicle region F is the central vehicle angle θ1*m*. The minimum values of each margin coefficient C1*r*, C1L, C1*u*, and C1*d* are all 1 or more.

The light distribution control ECU 10, for example, corrects the right margin coefficient and the left margin coefficient based on the lateral movement speed of the front vehicle in the front captured image. As an example, the light distribution control ECU 10 acquires an offset amount based on the lateral movement speed of the front vehicle in the front captured image and corrects the right margin coefficient and the left margin coefficient using the offset amount.

The light distribution control ECU 10, for example, acquires the right margin coefficient and the left margin coefficient obtained from the graphs of FIGS. 3A and 3B as basic margin coefficients when the movement speed is not equal to or greater than a predetermined value. The basic margin coefficient is the margin coefficient before correction. The movement speed can be, for example, the relative angular velocity of the front vehicle. The relative angular velocity may be calculated as the speed of change in angle based on the time change of the lateral position of the front vehicle in the front captured image. The predetermined value is a threshold value of the movement speed for switching whether to correct the right margin coefficient and the left margin coefficient. The predetermined value may be set in advance according to the processing speed of the light distribution control ECU 10, for example.

The light distribution control ECU 10 increases the right margin coefficient Cr when the movement speed is equal to or greater than a predetermined right threshold value in the right direction, compared to when the movement speed is not equal to or greater than the right threshold value in the right direction. The light distribution control ECU 10 may decrease the left margin coefficient CL when the movement speed is equal to or greater than the right threshold value in the right direction, compared to when the movement speed is not equal to or greater than the right threshold value in the right direction.

Figure 4A:
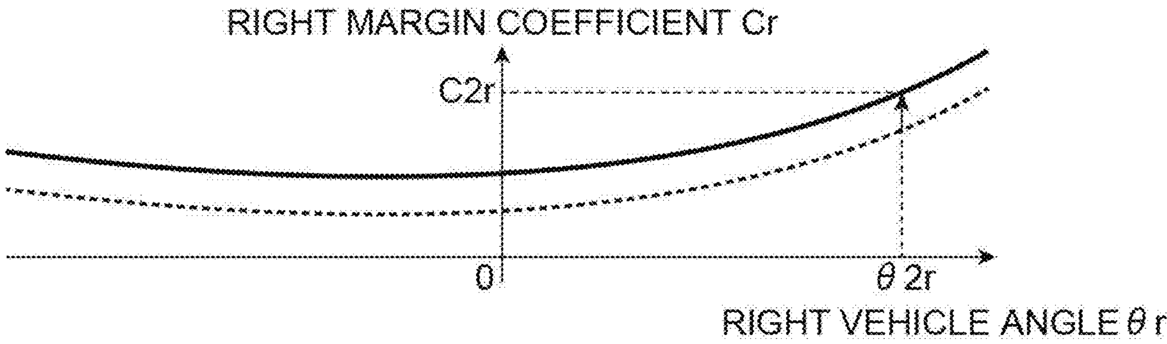
FIG. 4A is a diagram showing a graph of an offset right margin coefficient.
Figure 4B:
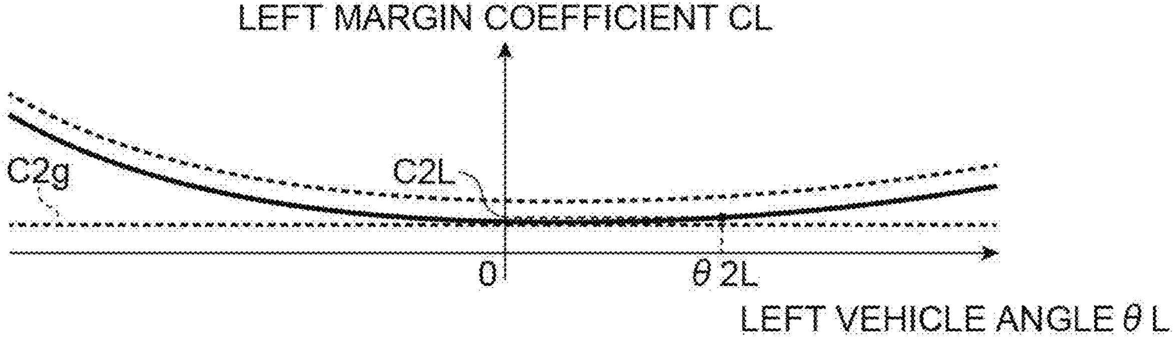
FIG. 4B is a diagram showing a graph of an offset left margin coefficient.

Specifically, FIG. 4A is a diagram showing a graph of the offset right margin coefficient. FIG. 4B is a diagram showing a graph of the offset left margin coefficient. As shown in FIGS. 4A and 4B, the offset amount means the amount of movement that offsets (translates) the curves of the right margin coefficient and the left margin coefficient in the vertical axis direction of the margin coefficient graph. In the graphs of FIGS. 4A and 4B, the light distribution control ECU 10 can be said to read the values shifted by the offset amount in the vertical axis direction from the graphs of FIGS. 3A and 3B. The offset amount may be a parameter or a variable value. The magnitude of the offset amount is set to be larger as the magnitude of the relative angular velocity of the front vehicle is larger, for example. The magnitude of the offset amount may be further adjusted according to the relative angular acceleration of the front vehicle.

The graphs of FIGS. 4A and 4B correspond to the case where the movement speed is equal to or greater than the right threshold value in the right direction. As shown in FIG. 4A, the right margin coefficient C2*r* is determined by reading out the solid line right margin coefficient C2*r* that is calculated by the dashed line right margin coefficient (basic margin coefficient) corresponding to the graph of FIG. 3A being increased by the offset amount at the right vehicle angle θ2*r* corresponding to the right end position of the front vehicle region.

As shown in FIG. 4B, the left margin coefficient C2L is determined by reading out the solid line left margin coefficient C2L that is calculated by the dashed line left margin coefficient (basic margin coefficient) corresponding to the graph of FIG. 3B being decreased by the offset amount at the left vehicle angle θ2L corresponding to the left end position of the front vehicle region. The left margin coefficient C2L is determined so as not to be smaller than the guard value C2*g*. The value of the guard value C2*g* is, for example, 1.

Figure 5:
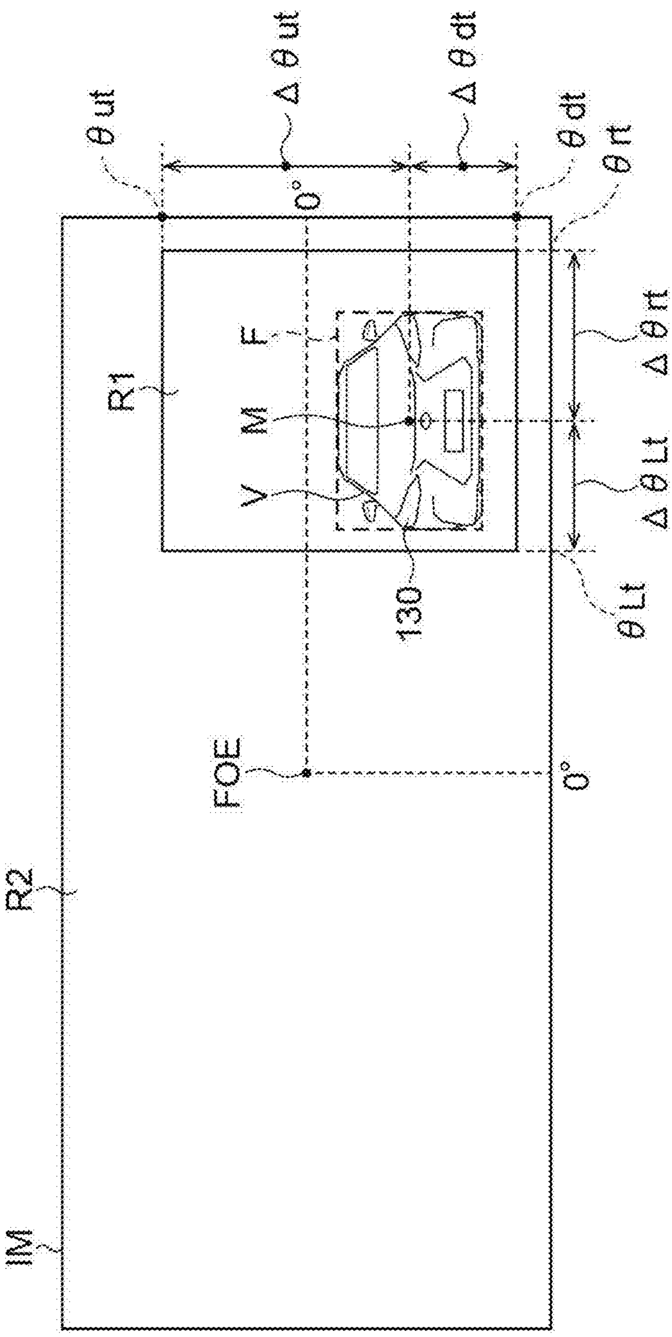
FIG. 5 is a diagram illustrating a range of a first region of the front vehicle in FIG. 2.

The light distribution control ECU 10 defines (sets) the first region including the front vehicle of the vehicle. FIG. 5 is a diagram illustrating a range of the first region of the front vehicle in FIG. 2. As shown in FIG. 5, the range of the first region R1 is defined, for example, by the shading horizontal angle and the shading vertical angle corresponding to the range of the first region R1. The shading horizontal angle is a horizontal angle representing the horizontal range in which the illuminance of the headlight is reduced as seen from the vehicle. The shading vertical angle is a vertical angle representing the vertical range in which the illuminance of the headlight is reduced as seen from the vehicle. In the example of FIG. 5, the range of the first region R1 is defined by the positions corresponding to the shading horizontal angles θrt and θLt and the shading vertical angles θut and θdt.

The light distribution control ECU 10 calculates the target shading angle corresponding to the range of the first region R1 to obtain the shading horizontal angles θrt and θLt and the shading vertical angles θut and θdt. The target shading angle is an angle representing the range of an angle in which the illuminance of the headlight is reduced as seen from the vehicle. The target shading angle includes a right target shading angle Δθrt, a left target shading angle ΔθLt, an upper target shading angle Δθut, and a lower target shading angle Δθdt.

The right target shading angle Δθrt corresponds to the horizontal length from the center M of the front vehicle to the right end of the first region R1. The right target shading angle Δθrt can be calculated by multiplying the right vehicle width angle Δθr by the right margin coefficient Cr. The left target shading angle ΔθLt corresponds to the horizontal length from the center M to the left end of the first region R1. The left target shading angle ΔθLt can be calculated by multiplying the left vehicle width angle ΔθL by the left margin coefficient CL.

The upper target shading angle Δθut corresponds to the vertical length from the center M to the upper end of the first region R1. The upper target shading angle Δθut can be calculated by multiplying the upper vehicle height angle Δθu by the upper margin coefficient Cu. The lower target shading angle Δθdt corresponds to the vertical length from the center M to the lower end of the first region R1. The lower target shading angle Δθdt can be calculated by multiplying the lower vehicle height angle Δθd by the lower margin coefficient Cd.

Here, with reference to FIGS. 6A to 7B, the significance of setting the range of the first region based not only on the lateral position of the front vehicle in the front captured image but also on the movement speed of the front vehicle moving laterally in the front captured image will be described.

Figure 6A:
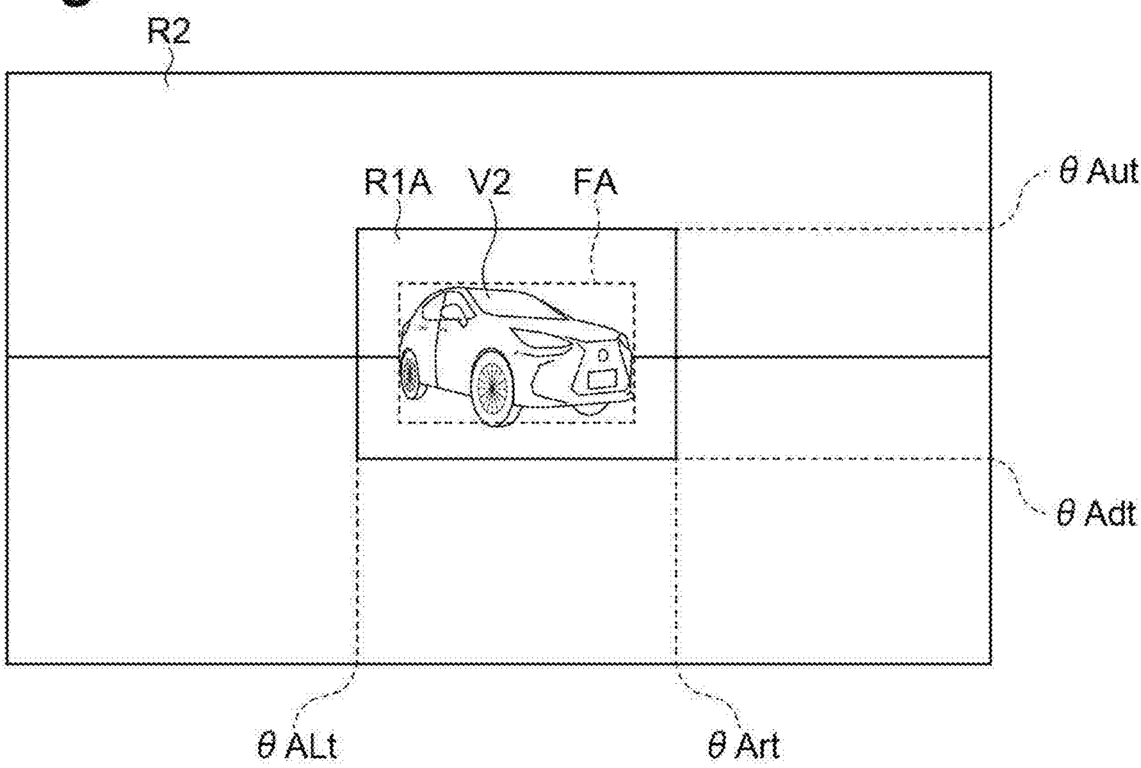
FIG. 6A is a diagram showing a comparative example of a range of the first region during a front vehicle moving laterally.

FIG. 6A is a diagram showing a comparative example of a range of the first region during a front vehicle moving laterally. In FIG. 6A, a front vehicle region FA surrounding the front vehicle V2 moving laterally near the center of the front captured image and the first region R1A are shown. The range of the first region R1A is defined by the positions corresponding to the shading horizontal angles θArt and θBLt calculated without correcting the basic margin coefficient and the shading vertical angles θAut and θAdt calculated without correcting the basic margin coefficient.

Figure 6B:
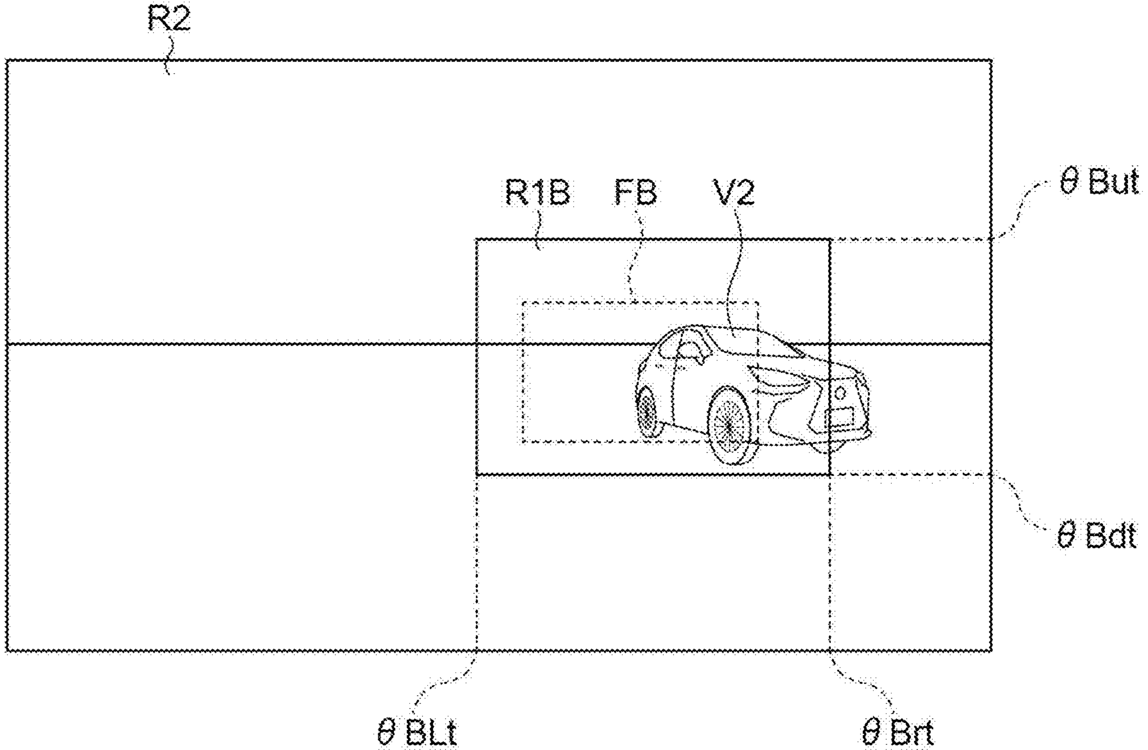
FIG. 6B is a diagram showing a comparative example of a range of the first region during the front vehicle in FIG. 6A moving further laterally.

FIG. 6B is a diagram showing a comparative example of a range of the first region during the front vehicle in FIG. 6A moving further laterally. In FIG. 6B, a front vehicle region FB and the first region R1B are shown for the front vehicle V2 moving rightward from near the center in the front captured image. The range of the first region R1B is defined by the positions corresponding to the shading horizontal angles θBrt and θBLt calculated without correcting the basic margin coefficient and the shading vertical angles θBut and θBdt calculated without correcting the basic margin coefficient.

In FIG. 6B, as the front vehicle V2 moves, the right end position and the left end position of the front vehicle region FB surrounding the front vehicle V2 move rightward from the state in FIG. 6A, so the right vehicle angle θr and the left vehicle angle θL, which read the basic margin coefficient in the graphs of FIGS. 3A and 3B, respectively change to the right values along the horizontal axis. Therefore, in the first region R1B, the right margin is larger than in the first region R1A. However, when the movement speed of the front vehicle V2 is equal to or greater than a predetermined value, for example, if the processing speed of the light distribution control ECU 10 is insufficient, the front vehicle V2 may deviate from the first region R1B as in the example of FIG. 6B.

Figure 7A:
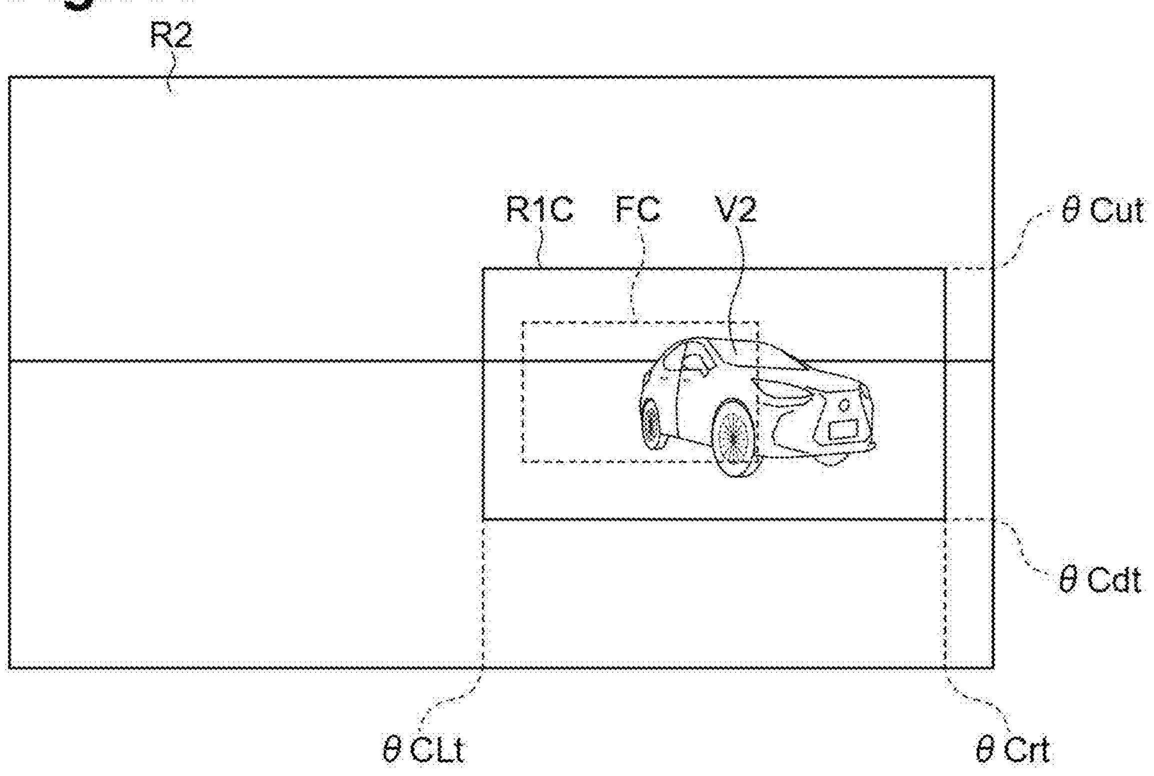
FIG. 7A is a diagram showing another comparative example of a range of the first region during the front vehicle in FIG. 6A moving further laterally.

FIG. 7A is a diagram showing another comparative example of a range of the first region during the front vehicle in FIG. 6A moving further laterally. In FIG. 7A, similar to FIG. 6B, a front vehicle region FC and the first region R1C are shown for the front vehicle V2 moving rightward from near the center in the front captured image. The range of the first region R1C is defined by the positions corresponding to the shading horizontal angles θCrt and θCLt calculated without correcting the basic margin coefficient and the shading vertical angles θCut and θCdt calculated without correcting the basic margin coefficient. However, in the example of FIG. 7A, anticipating the deviation of the front vehicle V2 from the first region R1B as in FIG. 6B, the basic margin coefficient is set to a larger value in advance than in the example of FIG. 6B. Therefore, in the first region R1C, the right margin is even larger than in the first region R1B. However, in the first region R1C, the left margin is excessively large for the front vehicle V2 moving rightward. Also, assuming that the front vehicle V2 is not moving laterally in the front captured image, using the basic margin coefficient set to a large value in advance may cause the range of the first region to become too wide.

Figure 7B:
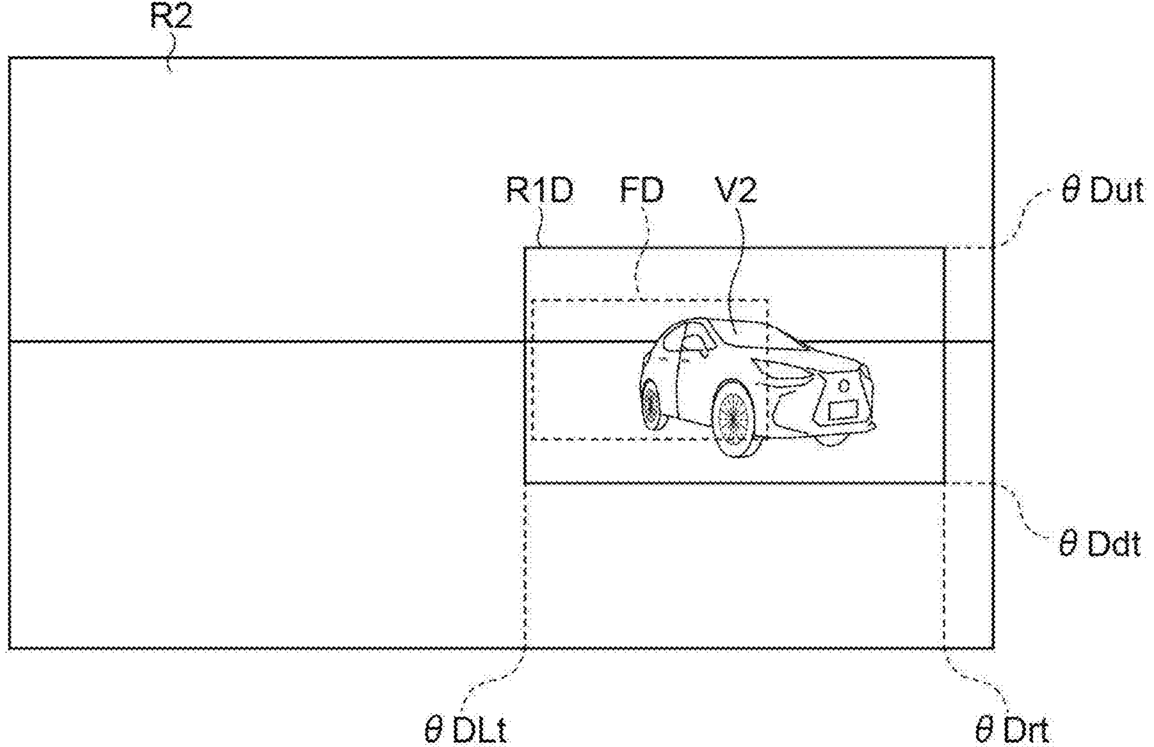
FIG. 7B is a diagram showing an example of a range of the first region during the front vehicle in FIG. 6A moving further laterally.

FIG. 7B is a diagram showing an example of a range of the first region during the front vehicle in FIG. 6A moving further laterally. In FIG. 7B, similar to FIG. 6B, a front vehicle region FD and the first region R1D are shown for the front vehicle V2 moving rightward from near the center in the front captured image. The range of the first region R1D is defined by the positions corresponding to the shading horizontal angles θDrt and θDLt calculated using the corrected right margin coefficient and left margin coefficient and the shading vertical angles θDut and θDdt calculated without correcting the basic margin coefficient. In the example of FIG. 7B, the movement speed of the front vehicle V2 is equal to or greater than the right threshold value in the right direction. The right end, left end, upper end, and lower end of the first region R1D are calculated using the increased right margin coefficient Cr and the decreased left margin coefficient CL. Therefore, in the first region R1D, the right margin is even larger than in the first region R1B. In the first region R1D, the left margin is smaller than in the first region R1B. This suppresses the deviation of the front vehicle V2 moving rightward from the first region R1D, unlike the example of FIG. 6B.

Also, assuming that the front vehicle V2 is not moving laterally in the front captured image, the movement speed of the front vehicle V2 becomes less than the right threshold value in the right direction, so the basic margin coefficient not corrected using the offset amount is used. Therefore, unlike the example of FIG. 7A, the range of the first region is prevented from becoming too wide for the front vehicle V2 not moving laterally.

The light distribution control ECU 10 selects the LED group to be subjected to extinguishing control among the LED matrix of the headlight 30. The light distribution control ECU 10 targets the LED group corresponding to the first region R1 for extinguishing control. The LED group subjected to extinguishing control can be selected by a known method based on, for example, the shading horizontal angles θrt and θLt, the shading vertical angles θut and θdt, and the vehicle state. The light distribution control ECU 10 executes adaptive high-beam control by extinguishing the selected LED group and lighting the other LED groups.

[Operation of Light Distribution Control Device]

Figure 8:
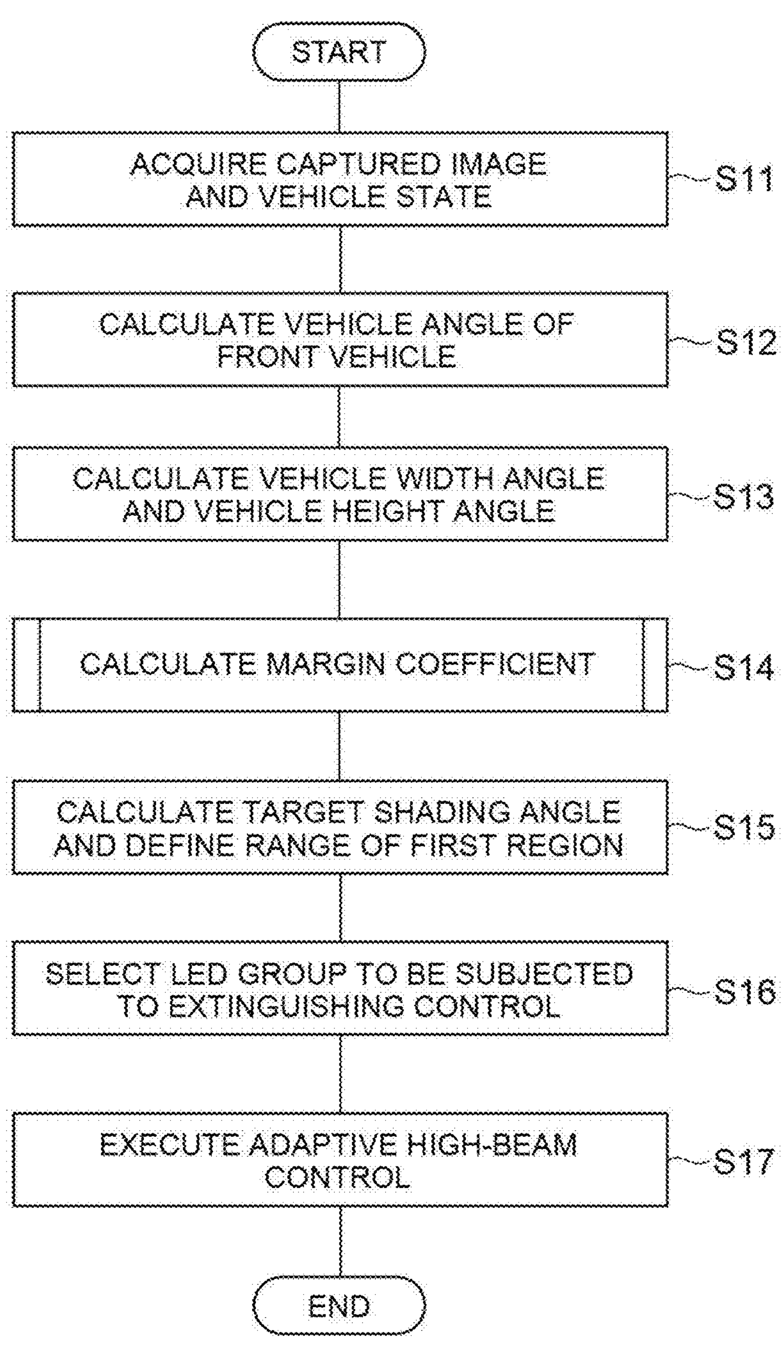
FIG. 8 is a flowchart showing an example of processing of the light distribution control ECU in FIG. 1.

Next, the operation of the light distribution control device 100 will be described with reference to the drawings. FIG. 8 is a flowchart showing an example of processing of the ECU in FIG. 1. The processing of the ECU in FIG. 8 is executed, for example, when the ambient illuminance is equal to or less than a predetermined ambient illuminance threshold value. The ambient illuminance may be calculated by a known method based on the front captured image. The processing of the ECU in FIG. 8 may be executed when the vehicle speed is equal to or greater than a predetermined vehicle speed threshold value.

As shown in FIG. 8, the light distribution control ECU 10 of the light distribution control device 100 acquires the captured image and the vehicle state in step S11. The light distribution control ECU 10 acquires the front captured image captured by the vehicle's camera of the front vehicle. The light distribution control ECU 10 acquires at least the vehicle speed as the traveling state. The light distribution control ECU 10 may acquire the acceleration and yaw rate of the vehicle as the traveling state.

In step S12, the light distribution control ECU 10 calculates the vehicle angle of the front vehicle. The light distribution control ECU 10 calculates the vehicle angle of the front vehicle based on the right end position, left end position, central position, upper end position, and lower end position of the front vehicle region surrounding the front vehicle in the front captured image, for example.

In step S13, the light distribution control ECU 10 calculates the vehicle width angle and the vehicle height angle. The light distribution control ECU 10 calculates the vehicle width angle and the vehicle height angle based on the vehicle angle, for example.

Figure 9:
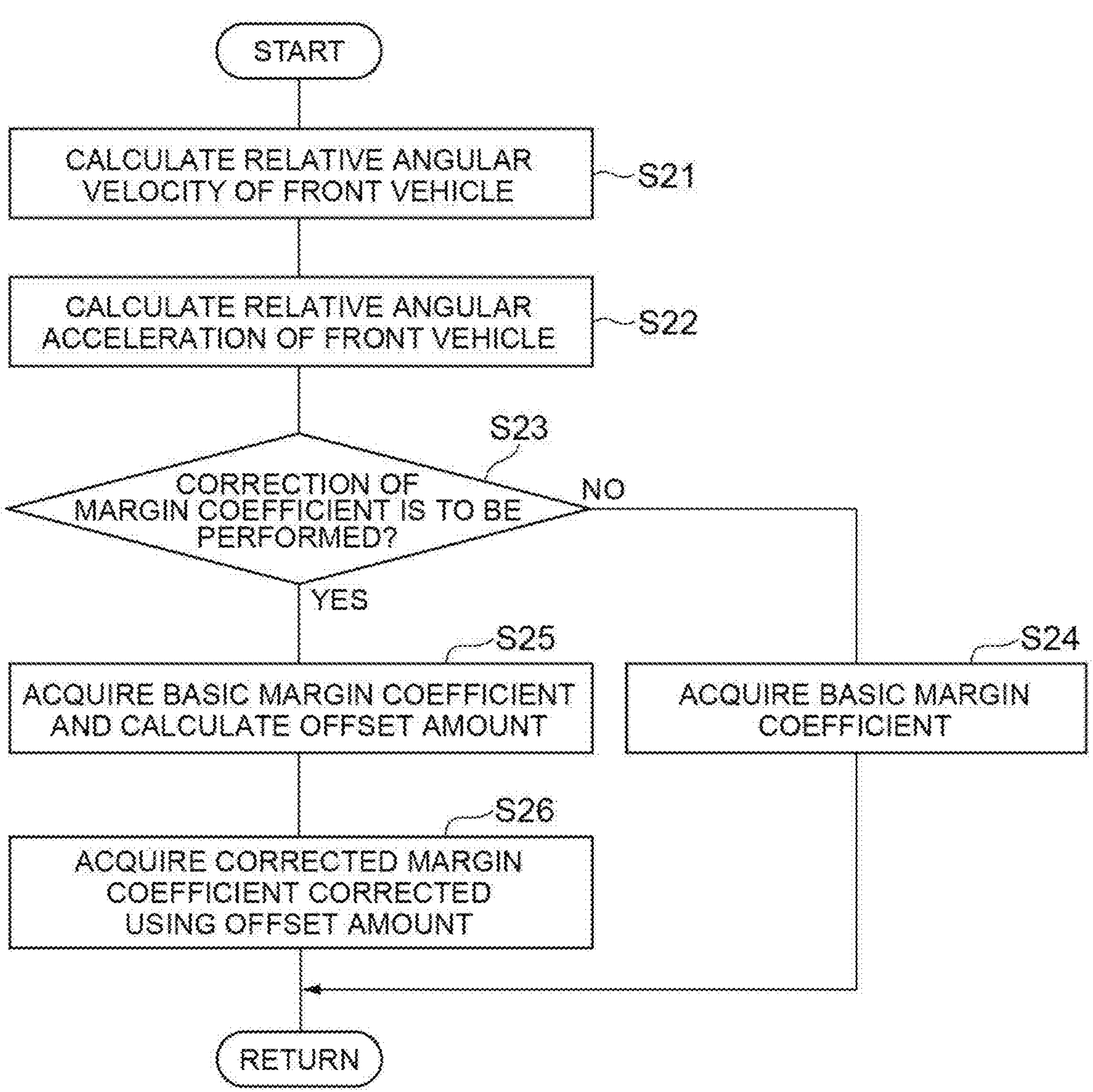
FIG. 9 is a flowchart showing an example of margin coefficient calculation processing in FIG. 8.

In step S14, the light distribution control ECU 10 calculates the margin coefficient (acquisition of right margin and left margin). The light distribution control ECU 10 may perform the processing of FIG. 9 as an example of the calculation of the margin coefficient. FIG. 9 is a flowchart showing an example of margin coefficient calculation processing in FIG. 8.

As shown in FIG. 9, in step S21, the light distribution control ECU 10 calculates the relative angular velocity of the front vehicle. The light distribution control ECU 10 acquires the relative speed of the front vehicle based on the detection result of the external sensor 20, for example. The light distribution control ECU 10 calculates the relative angular velocity of the front vehicle based on the traveling state of the vehicle and the relative speed of the front vehicle.

In step S22, the light distribution control ECU 10 may calculate the relative angular acceleration of the front vehicle. The light distribution control ECU 10 may calculate the relative angular acceleration based on the relative acceleration, for example.

In step S23, the light distribution control ECU 10 determines whether correction of the margin coefficient is to be performed. The light distribution control ECU 10 determines that correction of the margin coefficient is to be performed when the relative angular velocity of the front vehicle as the movement speed of the front vehicle is equal to or greater than a predetermined relative angular velocity threshold value in the right direction (right threshold value) or in the left direction (left threshold value), for example.

If it is determined that correction of the margin coefficient is not to be performed (S23: NO), in step S24, the light distribution control ECU 10 acquires the basic margin coefficient. Then, the light distribution control ECU 10 ends the current processing of FIG. 9 and returns to the processing of S15 in FIG. 8.

If it is determined that correction of the margin coefficient is to be performed (S23: YES), in step S25, the light distribution control ECU 10 acquires the basic margin coefficient and calculates the offset amount.

In step S26, the light distribution control ECU 10 acquires the corrected margin coefficient corrected using the offset amount. The corrected margin coefficient is the right margin coefficient and the left margin coefficient obtained by adding the offset amount to the basic margin coefficient. That is, when the movement speed of the front vehicle in the front captured image is equal to or greater than a predetermined right threshold value in the right direction, the light distribution control ECU 10 increases the right margin and decreases the left margin compared to when the movement speed is not equal to or greater than the right threshold value in the right direction. When the movement speed of the front vehicle in the front captured image is equal to or greater than a predetermined left threshold value in the left direction, the light distribution control ECU 10 increases the left margin and decreases the right margin compared to when the movement speed is not equal to or greater than the left threshold value in the left direction. Then, the light distribution control ECU 10 ends the current processing of FIG. 9 and returns to the processing of S15 in FIG. 8.

In step S15, the light distribution control ECU 10 calculates the target shading angle and defines the range of the first region (setting the range of the first region). The light distribution control ECU 10 calculates the target shading angle and defines the range of the first region using the calculated margin coefficient.

In step S16, the light distribution control ECU 10 selects the LED group to be subjected to extinguishing control. In step S17, the light distribution control ECU 10 executes adaptive high-beam control. Then, the light distribution control ECU 10 ends the current processing of FIG. 8.

In the light distribution control device 100 described above, the light distribution control ECU 10 sets the range of the first region R1D based not only on the lateral position of the front vehicle V2 in the front captured image but also on the movement speed of the front vehicle V2 moving laterally in the front captured image. By setting the range of the first region R1D based not only on the lateral position of the front vehicle V2 in the front captured image but also on the movement speed, it is possible to set the range of the first region R1D so as to suppress the deviation of the front vehicle V2 moving laterally in the front captured image when, for example, there is a delay in the processing of the light distribution control ECU 10. As a result, it is possible to prevent the range of the first region R1C from being set too wide in advance, which would otherwise occur when the front vehicle V2 is not moving laterally in the front captured image. Therefore, according to the light distribution control device 100, the range of the first region R1D can be set more appropriately when the front vehicle V2 is moving laterally in the front captured image compared to setting based solely on the lateral position of the front vehicle V2 in the front captured image.

In the light distribution control device 100, the light distribution control ECU 10 acquires the right margin to extend the first region R1D rightward relative to the right end position based on the right end position of the front vehicle region FD surrounding the front vehicle V2 in the front captured image. The light distribution control ECU 10 increases the right margin and decreases the left margin when the movement speed is equal to or greater than the right threshold value in the right direction, compared to when the movement speed is not equal to or greater than the right threshold value in the right direction. This allows the range of the first region R1D to be corrected laterally in accordance with the front vehicle V2 moving rightward in the front captured image.

Although the example of the present disclosure has been described above, the present disclosure is not limited to the above-described example. The present disclosure can be implemented in various forms with various modifications and improvements based on the knowledge of those skilled in the art, including but not limited to the above-described example.

In the above example, the movement speed of the front vehicle V2 in the front captured image was equal to or greater than a predetermined right threshold value in the right direction, but the movement speed of the front vehicle in the front captured image may be equal to or greater than a predetermined left threshold value in the left direction. In this case, the light distribution control ECU 10 acquires the left margin to extend the first region leftward relative to the left end position based on the left end position of the front vehicle region in the front captured image. For example, the light distribution control ECU 10 increases the left margin coefficient CL when the movement speed is equal to or greater than a left threshold value in the left direction, compared to when the movement speed is not equal to or greater than the left threshold value in the left direction. The light distribution control ECU 10 may decrease the right margin coefficient Cr when the movement speed is equal to or greater than a left threshold value in the left direction, compared to when the movement speed is not equal to or greater than the left threshold value in the left direction. In this case, for example, an offset amount that corrects in the opposite direction of the vertical axis direction of the graphs of FIGS. 4A and 4B can be used.

In the above example, the light distribution control ECU 10 corrected the right margin coefficient Cr and the left margin coefficient CL by adding or subtracting the offset amount along the vertical axis to set the range of the first region, but this example is not limited to this. For example, the light distribution control ECU 10 may acquire the right margin coefficient Cr using another offset amount along the horizontal axis to refer to a more rightward value in the graph of FIG. 3A when the front vehicle is positioned to the right of the vehicle and the movement speed of the front vehicle is equal to or greater than a right threshold value in the right direction. The light distribution control ECU 10 may acquire the left margin coefficient CL using another offset amount along the horizontal axis to refer to a more leftward value in the graph of FIG. 3B when the front vehicle is positioned to the left of the vehicle and the movement speed of the front vehicle is equal to or greater than a left threshold value in the left direction. Additionally, the light distribution control ECU 10 may pre-set another map reflecting correction values according to the movement speed of the front vehicle in the basic margin coefficient and acquire the right margin coefficient Cr and the left margin coefficient CL using this other map. In short, the light distribution control ECU 10 should set the range of the first region based not only on the lateral position of the front vehicle in the front captured image but also on the lateral movement speed of the front vehicle in the front captured image.

What is claimed is:

1. A light distribution control device for controlling a light distribution of a headlight that illuminates in front of a vehicle, the light distribution control device comprising:

a control unit configured to control the light distribution based on a front captured image of an onboard camera of the vehicle, so that an illuminance of a first region including a front vehicle located ahead of the vehicle is smaller than an illuminance of a second region not including the front vehicle, wherein the control unit is configured to set a range of the first region based on a lateral position of the front vehicle in the front captured image and a lateral movement speed of the front vehicle in the front captured image.

2. The light distribution control device according to claim 1, wherein the control unit is configured to acquire, based on a right edge position of a front vehicle region surrounding the front vehicle in the front captured image, a right margin to extend the first region rightward relative to the right edge position, the control unit is configured to acquire, based on a left edge position of the front vehicle region in the front captured image, a left margin to extend the first region leftward relative to the left edge position, the control unit is configured to increase the right margin and decreases the left margin when the movement speed is equal to or greater than a predetermined right threshold value in a right direction, compared to when the movement speed is less than the right threshold value in the right direction, and the control unit is configured to increase the left margin and decreases the right margin when the movement speed is equal to or greater than a predetermined left threshold value in a left direction, compared to when the movement speed is less than the left threshold value in the left direction.

* * * * *